United States Patent [19]

Dutler

[11] Patent Number: 4,866,643
[45] Date of Patent: Sep. 12, 1989

[54] METHOD FOR AUTOMATIC COMPENSATION OF PROBE OFFSET IN A COORDINATE MEASURING MACHINE

[75] Inventor: Werner Dutler, Haag, Switzerland

[73] Assignee: Brown & Sharpe Manufacturing Company, North Kingstown, R.I.

[21] Appl. No.: 107,253

[22] Filed: Oct. 9, 1987

[51] Int. Cl.$^4$ ............................................. G01B 11/24
[52] U.S. Cl. ............................. 364/571.02; 364/560; 364/474.35; 364/474.37; 364/167.01; 33/504
[58] Field of Search ................... 364/571.02, 560, 559, 364/474.36, 474.35, 474.37, 474.03, 167.01, 474.18; 33/503, 504, 505

[56] References Cited

U.S. PATENT DOCUMENTS

| | | | |
|---|---|---|---|
| 4,026,031 | 5/1977 | Siddall et al. | 33/503 |
| 4,084,243 | 4/1978 | Kishi et al. | 364/474.35 |
| 4,342,091 | 7/1982 | Whitehouse et al. | 364/506 |
| 4,564,914 | 1/1986 | Ballough et al. | 364/474.36 |
| 4,663,852 | 5/1987 | Guarini | 33/1 M |
| 4,724,525 | 2/1988 | Purcell et al. | 364/560 |

FOREIGN PATENT DOCUMENTS

| | | | |
|---|---|---|---|
| 2471629 | 6/1981 | France | 364/474.37 |
| 2089068 | 6/1982 | United Kingdom | 364/474.35 |

OTHER PUBLICATIONS

"3 Dimensional Touch Trigger Probes for Measuring Machines", *Renishaw Users Handbook*, Jul. 1979, pp. 1-37.
"MP3 Probe with 360° Optical Transmission System", *Renishaw Users Handbook*, Nov. 1984, pp. 1-37.
"Programs for Probes, Component Inspection and Tool Data Using with Fanuc 6TB Control", *Reinshaw Users Handbook*, 12/84, pp. 1-64.

Primary Examiner—Parshotam S. Lall
Assistant Examiner—S. A. Melnick
Attorney, Agent, or Firm—Wolf, Greenfield & Sacks

[57] ABSTRACT

A method for automatic probe offset compensation in a machine for measuring coordinates of a workpiece surface by contacting points on the surface with a probe having a prescribed diameter and sensing and recording the coordinates of the probe. The method can be applied to planar surfaces and circularly curved surfaces. The method includes determining a direction point in space just prior to contact with the workpiece surface, determining a directional vector between the direction point and the first contact point, and determining the angle of the directional vector relative to a normal to the surface. When the angle is within a predetermined range of acceptance, the direction point is considered valid. In the case of a planar surface, the measured surface is shifted by the probe offset in a direction opposite the normal vector so that the measured surface and the workpiece surface coincide. In the case of a curved surface, the distance from the direction point to the centerpoint of the measured surface is compared with the radius of the measured surface, and the probe offset is added to or subtracted from the radius so that the measured surface and the workpiece surface coincide. In a further refinement, the direction point is considered invalid if it is within the distribution of measured contact points.

14 Claims, 7 Drawing Sheets

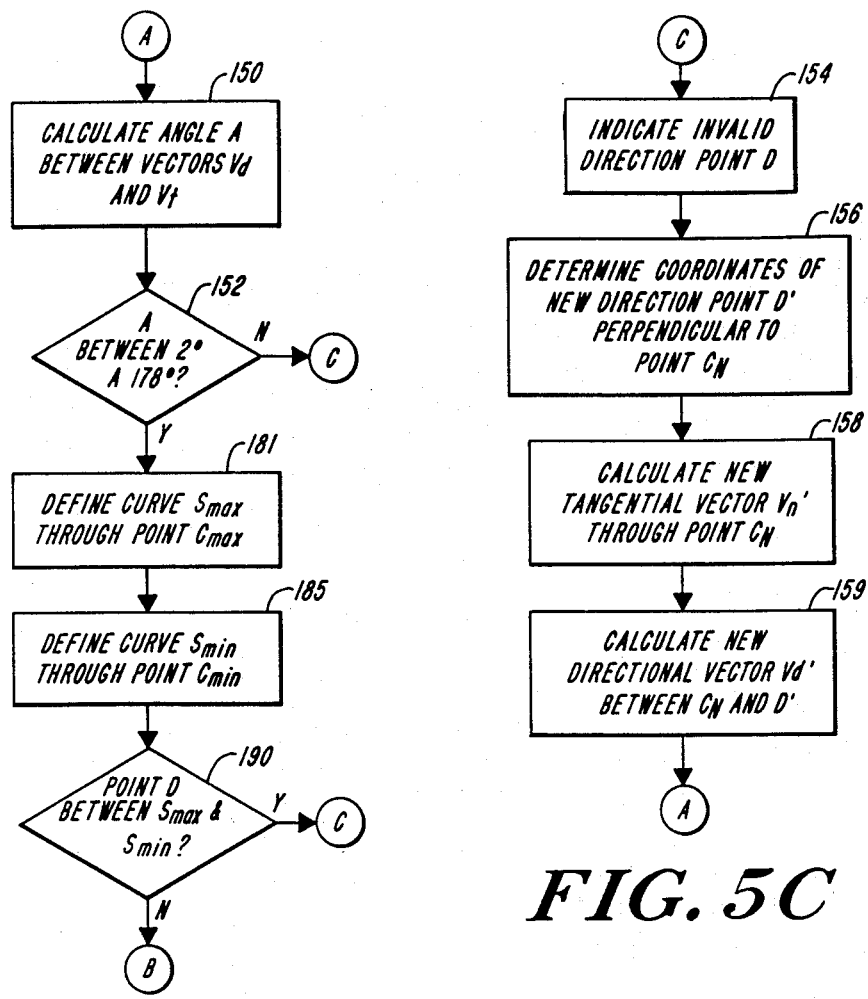
*FIG. 5B*
*FIG. 5C*
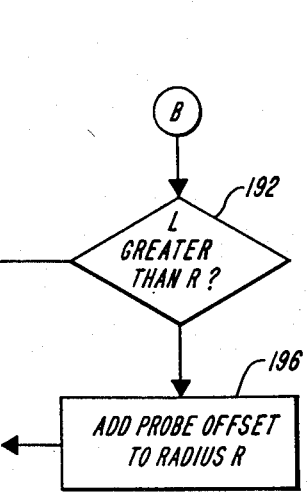
*FIG. 5D*

METHOD FOR AUTOMATIC COMPENSATION OF PROBE OFFSET IN A COORDINATE MEASURING MACHINE

FIELD OF THE INVENTION

This invention relates to machines for measuring the coordinates of points and surfaces on a workpiece and, more particularly, to a technique for automatically compensating the measurements for the radius of a probe used to take the measurements.

BACKGROUND OF THE INVENTION

Coordinate measuring machines are used for dimensional inspection of workpieces such as machine parts. A workpiece is secured to a table, and a measuring probe is mounted to a movable ram. In order to measure the coordinates of a point on the workpiece, the probe is brought into contact with the point. X, y and z measuring scales that indicate the coordinates of the probe in the measurement volume of the machine are sensed and recorded. State-of-the-art coordinate measuring machines have refinements such as high resolution measuring systems, electrical contact probes, motor drives, computer control drives and computer acquisition and processing of coordinate data.

The probe used to contact the points on the workpiece is typically in the form of spherical ball at the end of a shaft attached to the movable ram. The coordinates sensed by the system are the coordinates of the center point of the probe. However, the actual point of contact between the probe and the workpiece is a point on the surface of the spherical ball. Thus, the coordinate values sensed by the system differ from the actual coordinates of the point on the workpiece by the radius of the spherical ball, commonly known as "probe offset." Furthermore, since the probe may approach the workpiece from any direction, the direction between the actual contact point and the probe center is variable from measurement to measurement.

In addition to measuring coordinates of points on the workpiece, coordinate measuring systems typically can measure various geometric shapes such as planes, straight lines, circles, cylinders, cones and spheres. A plane is defined by a vector normal to the plane and the coordinate of the intersection between the plane and the normal vector. Circles, cylinders and spheres are defined by the coordinates of a center point or center axis and the magnitude of the radius.

In compensating for probe offset, the magnitude of the probe offset is known and fixed. However, the direction of the probe offset is not known to the measuring system and is not fixed. For example, the probe can approach a planar surface from either direction and from different angles. A curved surface can be an outside diameter, such as a cylindrical surface, or an inside diameter, such as a hole in a part. Thus, it has been difficult to automatically compensate measured coordinates for probe offset.

In a prior art system, an operator was required, prior to each set of measurements, to manually enter certain parameters, such as inside diameter, outside diameter or direction of approach to a plane, into the coordinate measuring machine computer. The system then determined the required direction of probe offset compensation. While this technique is in theory reliable, errors were often made by the operator, requiring repeated measurements or providing erroneous data. In addition, the speed of the system was reduced by the necessity to manually enter such information.

It is a general object of the present invention to provide an improved coordinate measuring machine.

It is another object of the present invention to provide a method for automatically compensating for probe offset in a coordinate measuring machine.

It is a further object of the present invention to provide a highly accurate method for automatic probe offset compensation.

It is yet another object of the present invention to improve the speed and accuracy of coordinate measuring machines.

It is a further object of the present invention to provide coordinate measuring machines with simple operating procedures.

SUMMARY OF THE INVENTION

According to the present invention, these and other objects and advantages are achieved in a method for automatic probe offset compensation in a machine for measuring coordinates of a surface on a workpiece by contacting points on the surface with a probe having a prescribed diameter and sensing and recording the coordinates of the probe. The method can be applied to coordinate measurements of a plane, a straight line, a circle, a cylinder, a sphere or a cone. Most workpieces of interest are composites of these basic geometric shapes.

According to one aspect of the present invention, the method for probe offset compensation for a planar surface includes the steps of (a) measuring the coordinates of a direction point D just before contact between the probe and the planar surface; (b) measuring the coordinates of at least three contact points $C_1-C_N$ with the probe and the planar surface in contact; (c) fitting a plane S to the contact points $C_1-C_N$, the plane S being defined by a normal vector $V_n$ passing through the first contact point $C_1$ and a coordinate of the intersection between plane S and vector $V_n$; (d) calculating a directional vector $V_d$ between the first contact point $C_1$ and direction point D; (e) when an angle A between the normal vector $V_n$ and the directional vector $V_d$ is greater than 90°, reversing the direction of the normal vector $V_n$; (f) when the angle A is within a predetermined range of acceptance, moving the plane S by the dimension of the probe offset in a direction opposite the direction of the normal vector $V_n$; and (g) when the angle A is in the range between the predetermined range of acceptance and 90°, rejecting the direction point D as invalid and repeating the compensation procedure.

According to another important aspect of the present invention, a method for probe offset compensation for a curved surface includes the steps of (a) measuring the coordinates of a direction point D just before contact between the probe and the curved surface; (b) measuring the coordinates of at least three contact points $C_1-C_N$ with the probe and the curved surface in contact; (c) fitting a curve S to the contact points $C_1-C_N$, the curve S being defined by center O and a radius R; (d) calculating a tangential vector $V_t$ tangent to the curve S at the first contact point $C_1$; (e) calculating a directional vector $V_d$ between the first contact point $C_1$ and direction point D; (f) calculating an angle A between the tangential vector $V_t$ and the directional vector $V_d$; (g) when the angle A is within a predetermined range of acceptance and the distance between direction point D and the center O of curve S is greater than the radius R of curve S, subtracting the probe offset from the radius of the curve S; (h) when the angle A is within the predetermined range of acceptance and the distance between the direction point D and the center O of curve S is less than the radius R of curve S, adding the probe offset to the radius R of the curve S; and (i) when the angle A is outside the predetermined range of acceptance, rejecting the direction point D as invalid and repeating the compensation procedure.

Typically, a least squares fit algorithm is used to fit a plane or a curve to the contact points $C_1$–$C_N$. The direction point D is preferably determined by measuring the coordinates of two sample points just before contact between the probe and the workpiece surface and averaging the coordinates of the two sample points.

A further refinement in accordance with the present invention to insure accurate probe offset compensation includes the steps of defining a plane $S_{max}$ parallel to plane S and passing through the contact point with maximum deviation from plane S in the direction of normal vector $V_n$, defining a plane $S_{min}$ parallel to plane S and passing through the contact point with maximum deviation from plane S in the direction opposite to the normal vector $V_n$ and rejecting the direction point D as invalid if it is located between the planes $S_{max}$ and $S_{min}$ and repeating the compensation procedure. A similar procedure is utilized for a curved surface.

When the direction point D is rejected as invalid, the step of repeating the compensation procedure for a planar surface preferably includes the steps of measuring the coordinates of a new direction point D' approximately perpendicular to the last contact point $C_N$, defining a new normal vector $V_n'$, passing through the last contact point $C_N$, calculating a new directional vector $V_d'$ between the last contact point $C_N$ and the new direction point D' and repeating the above procedure with the vectors $V_n$ and $V_d$ replaced by the vectors $V_n'$ and $V_d'$. A similar series of steps is utilized for a curved surface.

BRIEF DESCRIPTION OF THE DRAWINGS

For a better understanding of the present invention together with other and further objects, advantages and capabilities thereof, reference is made to the accompanying drawings which are incorporated herein by reference and in which:

FIGS. 4A–4E are schematic diagrams illustrating the probe offset compensation technique for a curved surface; and FIGS. 5A–5D are flow charts illustrating the probe offset compensation technique for a curved surface.

DETAILED DESCRIPTION OF THE INVENTION

Figure 1:
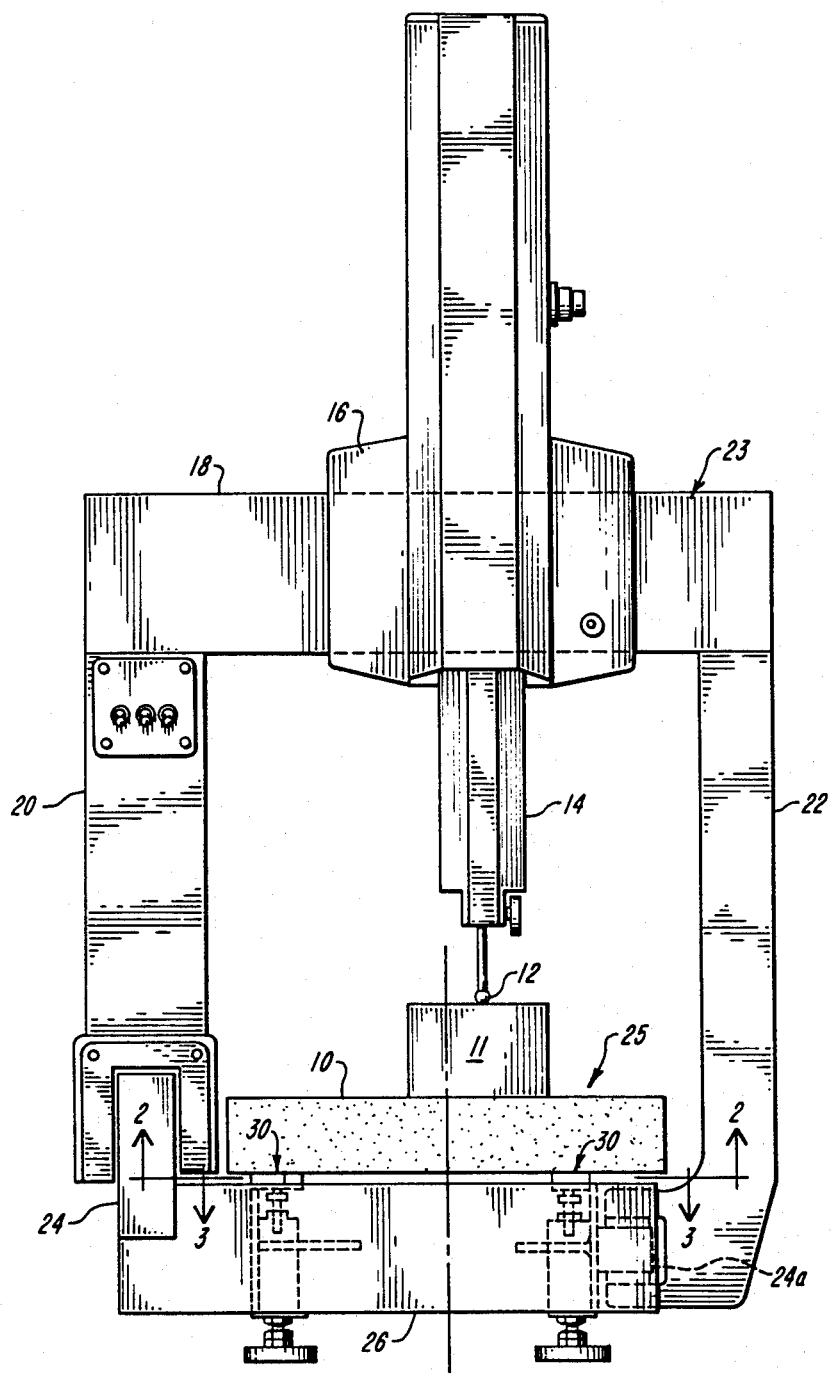
FIG. 1 is a side elevation view of a coordinate measuring machine suitable for incorporation of the probe offset compensation method of the present invention.

A coordinate measuring machine suitable for incorporation of the probe offset compensation method of the present invention is shown in FIG. 1. A worktable 10 supports a workpiece 11 to be measured. A manually movable probe 12 is brought into contact with points on the surface of the workpiece and the coordinates of each point are measured and recorded by the machine. The probe 12 is carried by a z-rail 14. The z-rail 14 is movable vertically in the z direction through bearings in a carriage 16. The carriage 16 is movable horizontally in the x direction along guideways on ah x-rail 18. The x-rail 18 is carried by vertical support members 20 and 22, which together with x-rail 18, form a bridge 23 which is movable in the y direction along y-rails 24 and 24a. A base assembly 25 includes a base 26, the worktable 10 and support means 30 for coupling the worktable 10 to the base 26. The bridge 23 is supported by the base 26.

Figure 1A:
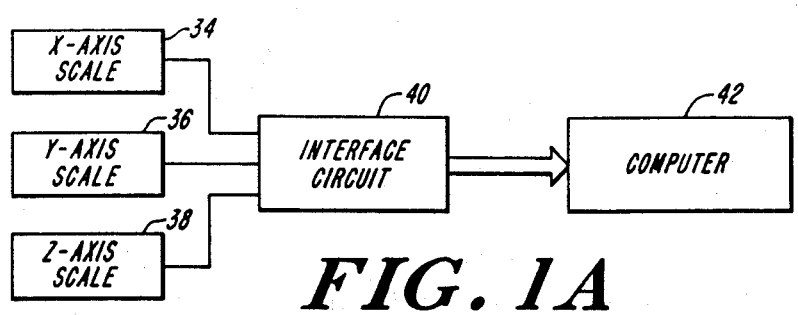
FIG. 1A is a block diagram showing the measurement scales and the combuter.

Scales 34, 36, 38 shown in FIG. 1A sense movement by probe 12 in the x, y and z directions, respectively, so that the probe coordinates can be continuously monitored. The scale output signals are provided through interface circuitry 40 to a computer 42, such as an Intel 80186 microprocessor. Typically, in the measurement of a workpiece, the probe 12 is brought into contact with a plurality of points on the workpiece surface, and the coordinates of each point are sensed by the scales 34, 36, 38 and recorded by the computer 42.

The probe 12 can be of the type which electrically senses contact with a workpiece at each point and provides a signal to activate the measuring circuitry. Alternatively, separate manual means such as a pushbutton switch can be provided to activate the measuring circuitry when the probe 12 is in contact with the workpiece. "Workpiece surface" as used herein can refer to any external or internal surface of a workpiece accessible by the probe 12. For example, the coordinate measuring machine is commonly used to measure the inside dimensions of various holes in machined parts. Coordinate measuring machines conventionally have the capability of measuring the coordinates of individual points on the workpiece surface and also of providing the definitions of various geometric surfaces that make up the workpiece. For example, a plane surface can be defined by a vector normal to the plane and the x, y, z coordinates of the point of intersection between the normal vector and the plane. Similarly, a circle or a sphere can be defined by the coordinates of the center point and the radial dimension, while a cylindrical surface can be defined by the coordinates of the center axis and the radial dimension.

As noted above, the coordinate measuring machine measures and records the coordinates of the center of the probe 12, thereby introducing a probe offset error between the measured coordinates and the actual point of contact between the probe 12 and the workpiece. The magnitude of the probe offset is known, since the probe tip is spherical. However, the direction of probe offset is variable, since the probe 12 can be bought into contact with the workpiece from any direction.

The method of the present invention provides a technique for automatically determining the direction of probe offset and compensating the measured coordinates for probe offset error without requiring any extra effort by the machine operator, except in the case of invalid direction points as described hereinafter. The probe offset compensation method of the invention applies to measurements of planar surfaces and to the special case of a straight line. In addition, the method of the present invention applies to circular surfaces including spheres, cylinders, cones and the special case of a circle. It does not apply to the measurement of coordinates of individual points nor does it apply to the measurement of coordinates of arbitrarily-shaped surfaces, unless those surfaces can be broken down into the above-mentioned shapes. The probe offset compensation method of the present invention is preferably performed automatically by the coordinate measuring machine computer 42.

Figure 2A:
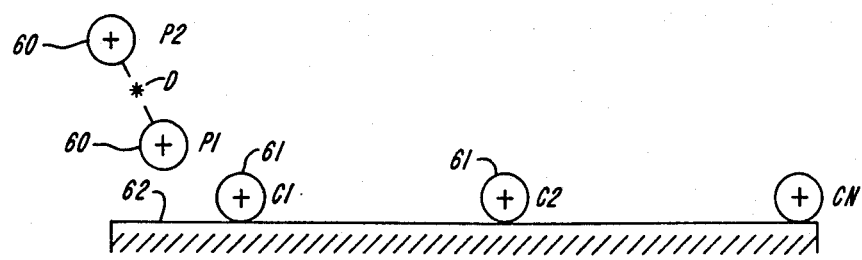
FIGS. 2A–2E are schematic illustrations of the probe compensation technique for a planar surface.

The probe offset compensation method of the invention for planar surfaces is described with reference to the schematic illustrations of FIGS. 2A-2E and the flow chart of FIGS. 3A-3D. In FIGS. 2A-2E, the probe 12 is represented schematically by circles 60 at different position sample points and by circles 61 at different measurement points, and a planar part surface being measured is indicated at 62. The coordinate measuring machine continuously samples the x, y, z coordinates of the probe 12, and the samples are stored each time the probe moves along one or more axis by a prescribed sample distance. Previously-stored points are discarded unless the probe comes into contact with a workpiece. Initially, the probe is moved toward the planar surface 62 and position sample points $P_2$ and $P_1$ are taken just above the planar surface 62, as indicated in FIG. 2A and in step 63 of FIG. 3A. Points $P_1$ and $P_2$ are the last two sample points taken before a contact point $C_1$ is taken with the probe and the surface 62 in contact. A direction point D is calculated as the midpoint between sample points $P_1$ and $P_2$ simply by averaging the x, y and z coordinates of points $P_1$ and $P_2$. Thus, D $(x_D, y_D, z_D) = (x_{P1}+x_{P2})/2$, $(y_{P1}+y_{P2})/2$, $(z_{P1}+z_{P2})/2$. The midpoint between points $P_1$ and $P_2$ provides a more accurate location from which the direction vector can be calculated because: (1) the last sample point may be too close to the contact point $C_1$ to obtain a good angular direction vector as described hereinafter; and (2) the last sample point may be closer to the part surface than the contact point $C_1$ due to deflection of the machine or probe overtravel during contact with the part surface.

Figure 2B:
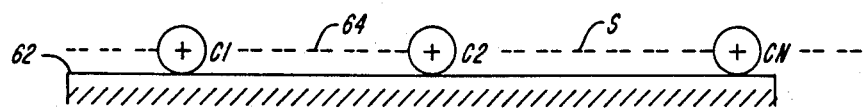
Figure 2C:
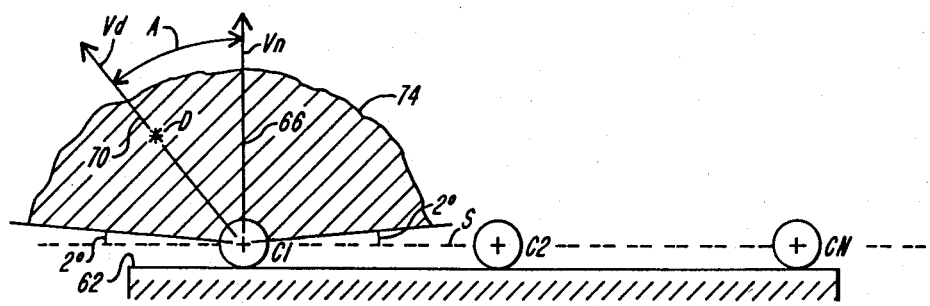
Figure 3A:
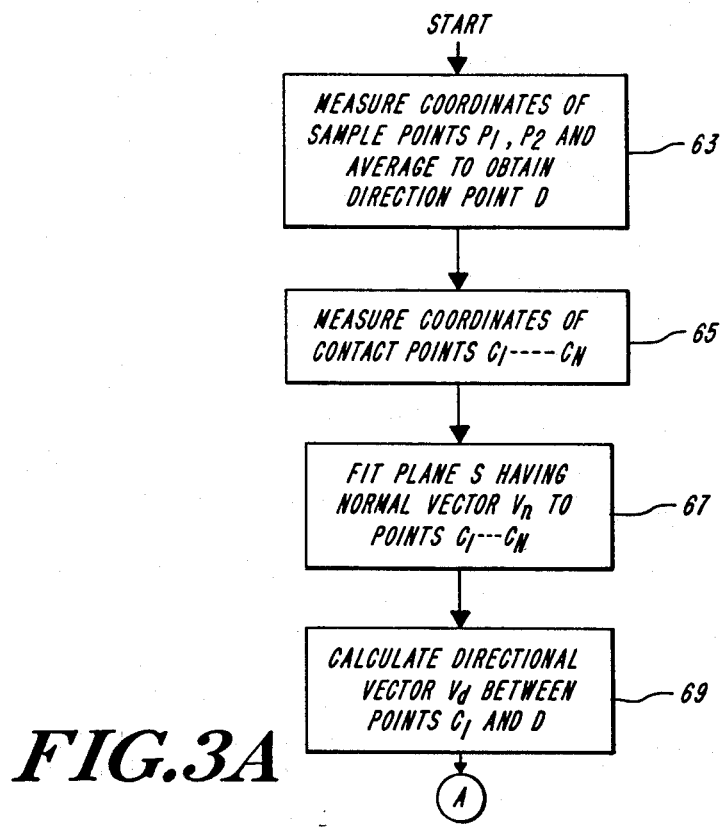
FIGS. 3A–3D are flow charts illustrating the probe offset compensation method for a planar surface.

A series of contact points $C_1, C_2-C_N$ are taken on the planar surface 62 of the part being measured as a normal part of the measurement routine, as shown in FIG. 2A and in step 65 of FIG. 3A. At least three contact points are required to define a planar surface, and typically, more than three contact points are taken. A plane S as indicated at 64 in FIG. 2B is then constructed through the contact points $C_1-C_N$, in step 67 of FIG. 3A, using a standard best fit algorithm such as a least squares algorithm. The plane 64 is approximately parallel to the planar surface 62 being measured. The plane 64 is defined by the algorithm as a normal vector $V_n$ as indicated at 66 in FIG. 2C and the coordinates of the intersection between the plane 64 and the normal vector $V_n$. The normal vector $V_n$ is defined as passing through the first contact point $C_1$.

A directional vector $V_d$, as indicated at 70 in FIG. 2C, is defined as a vector between the first contact point $C_1$ and the direction point D. The directional vector $V_d$ is calculated in step 69 of FIG. 3A by subtracting the x, y, z coordinates of contact point $C_1$ from those of direction point D. Thus, $V_d(x_{Vd}, y_{Vd}, z_{Vd}) = (x_D - x_{C1}, y_D - y_{C1}, z_D - z_{C1})$.

An angle A as indicated at 72 in FIG. 2C is defined as the angle between the normal vector $V_n$ and the directional vector $V_d$. The angle A is calculated in step 71 of FIG. 3B and is utilized to determine the direction of the probe offset. In addition, the angle A is utilized to identify invalid direction points D. Valid and invalid direction points are determined based on the angle A between the normal vector $V_n$ and the directional vector $V_d$. It is preferred that the probe approach the first contact point $C_1$ along the normal vector $V_n$ (perpendicular to the planar surface 62) or within a prescribed range of acceptable angles from the normal vector $V_n$. In a preferred embodiment, the preferred range of acceptable angles A between normal vector $V_n$ and directional vector $V_d$ is $+88°$. The range of acceptance of angle A is indicated in FIG. 2C by shaded area 74, which forms an inverted cone. The range of acceptance of angle A is specified so as to prevent the operator from approaching the first contact point $C_1$ along a shallow angle. In the extreme case, the operator could approach the planar surface 62 and slide the probe along the surface, thereby providing erroneous information to the probe offset compensation software. It will be understood that while a range of acceptable angles A of $\pm 88°$ is preferred, other ranges of acceptable angles can be specified within the scope of the present invention, depending on the parameters of a particular application.

Figure 2D:
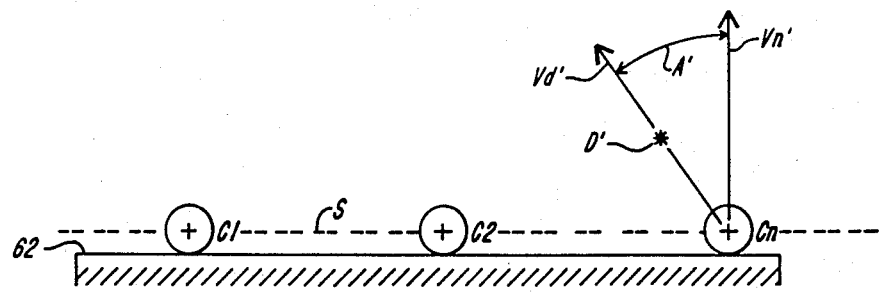
Figure 3B:
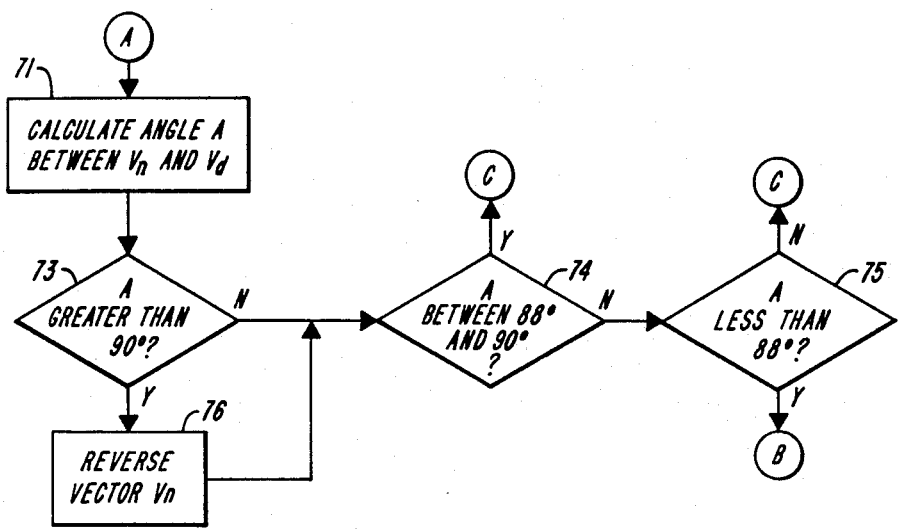

After calculation of the angle A between the normal vector $V_n$ and the directional vector $V_d$, the value of the angle A is compared with predetermined limits as shown in steps 73, 74, 75 of FIG. 3B. When angle A is greater than 90° (step 73), the direction of the normal vector $V_n$ is reversed in step 76. The angle A is then compared with the predetermined limits of the range of acceptance. When a $\pm 88°$ range of acceptance is utilized, angles A between the limits of 88° and 90° (step 74) indicate that the directional vector $V_d$ is outside the acceptable range. In this case, a message is displayed to the operator in step 77 of FIG. 3C indicating that a bad, or invalid, direction point has been identified and requiring measurement of a new direction point. When such a message is displayed, the operator must measure a new direction point D', as indicated in FIG. 2D and step 78 of FIG. 3C, by moving the probe off the surface 62 in a direction approximately perpendicular to the last contact point $C_N$ and taking a coordinate measurement in space. A new normal vector $V_n'$ is defined through point $C_N$ in step 79. The new direction point D' is then used in step 81 to calculate a new directional vector $V_d'$ by subtracting the coordinates of contact point $C_N$ from the coordinates of direction point D', as described above with respect to directional vector $V_d$.

The process then returns to step 71, and a new angle A' is calculated between normal vector $V_n'$ and directional vector $V_d'$. The process compares the angle A' with the predetermined range of acceptable angles in accordance with steps 73, 74, 75. When the angle A' is greater than 90°, the vector $V_n'$ is reversed in step 76, as described above. When the angle A' is between 88° and 90°, yet another direction point measurement is required, as described above.

Assume now that the angle A' is within the range of acceptance, which in the present example requires that angle A' be less than $\pm 88°$. In this case, the process can proceed normally. It will be understood that in the large majority of cases, the first angle A will be within the range of acceptance, and measurement of a new direction vector $V_d$ will not be required.

Figure 2E:
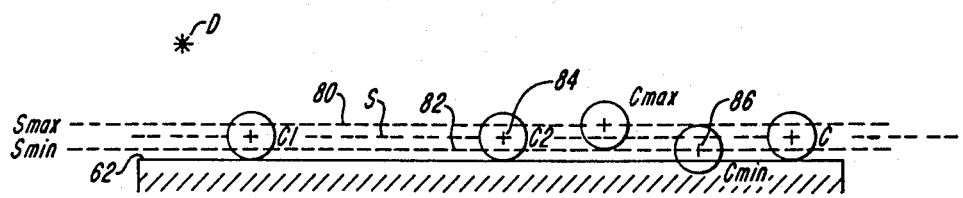
Figures 3C, 3D:
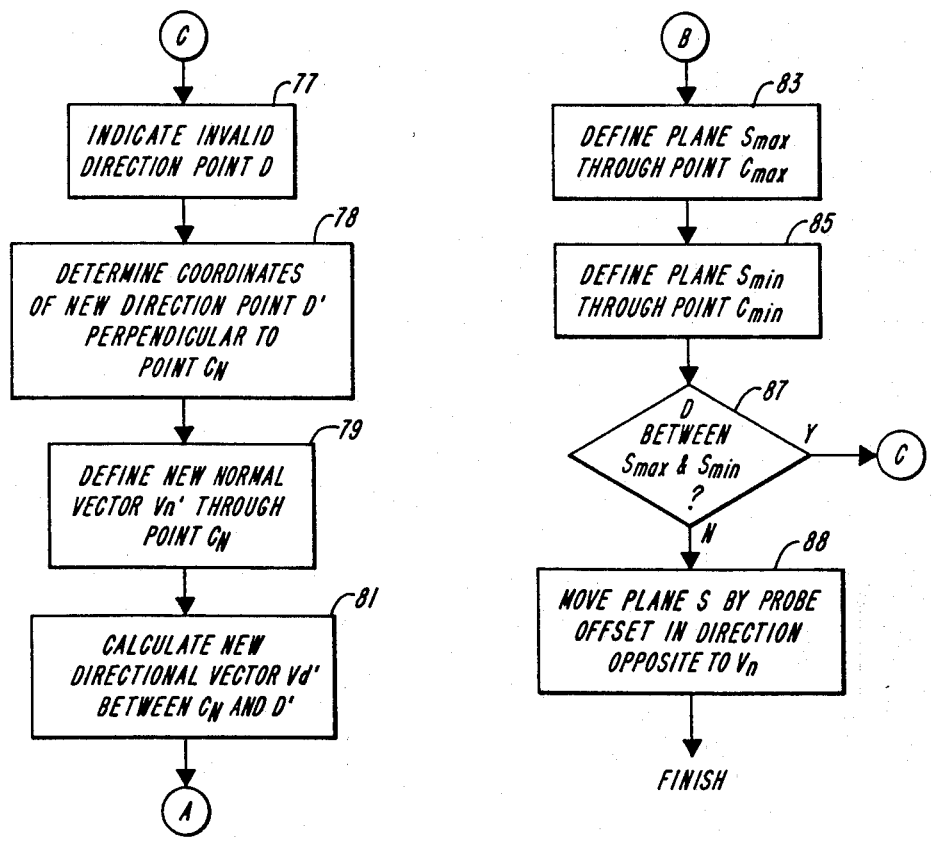

In either case, when the angle A or A' is within the range of acceptable angles, a further verification of the direction point as valid is performed as follows. Planes $S_{max}$ and $S_{min}$, as indicated by numerals 80 and 82, respectively, in FIG. 2E are constructed parallel to the plane S. Plane $S_{max}$ is constructed in step 83 of FIG. 3D through the contact point $C_{max}$, as indicated by the numeral 84, which has the maximum deviation from plane S in the direction of the normal vector $V_n$. The plane $S_{min}$ is constructed in step 85 through the contact point $C_{min}$, as indicated by the numeral 86, which has the maximum deviation from the plane S in the direction opposite the normal vector $V_n$. When the direction point D or D' is located in step 87 between the planes $S_{max}$ and $S_{min}$, then the direction point is rejected as invalid and the operator is required to take a new direction point D'. Then, steps 77, 78, 79 and 81 of FIG. 3C are performed as described above in order to determine a new directional vector $V_d'$ and a new normal vector $V_n'$. A new angle A' is then calculated and evaluated. The rejection of direction points D or D' located between $S_{max}$ and $S_{min}$ prevents misinterpretation of the direction to the surface 62 when it is approached from a direction which is opposite to the direction of the normal vector $V_n$. This can be done by approaching the surface 62 from around a corner. The rejection of direction points between planes $S_{max}$ and $S_{min}$ also detects when the operator slides the probe across the surface 62 prior to taking the first contact point $C_1$.

After the above steps have successfully verified a valid direction point, the plane S is then moved in step 88 by a distance equal to the probe offset (one-half of the effective probe diameter) in a direction opposite the direction of the normal vector $V_n$ or $V_n'$. The shifting of the plane S by the probe offset makes the calculated plane S and the planar surface 62 coincide.

The probe offset compensation method of the present invention for curved surfaces is now described with reference to the schematic illustrations of FIGS. 4A–4E and the flow chart of FIGS. 5A–5D. In a number of respects, the probe offset compensation method for curved surfaces is similar to that for planar surfaces. However, the probe can be contacting either an inside diameter or an outside diameter of a curved surface, and it is critical that the system distinguish between the two when compensating for probe offset.

The direction point D for a curved surface is determined in the same way as for a planar surface. The last two sample points $P_1$ and $P_2$ are taken just before the probe contacts a curved part surface, as indicated at 160 in FIG. 4A. The direction point D is preferably approximately perpendicular to a tangent to the curved surface at a first contact point $C_1$ on the part surface 160. The direction point D is calculated in step 140 of FIG. 5A as the midpoint between sample points $P_1$ and $P_2$. A plurality of contact points $C_1$, $C_2$–$C_N$ is taken on the curved surface 160 in step 142. At least three contact points are required, and preferably more than three contact points are taken. Next, a curve S, as indicated at 162 in FIG. 4B, is fit to the contact point $C_1$–$C_N$ in step 144 using a standard best fit algorithm such as a least squares fit algorithm. The curve S is approximately parallel to the curved surface 160 and is defined by the coordinates of the center point O and a radius R. When an outside curve is being measured, the constructed curve S is larger in radius than the part surface 160; and when an inside curve is being measured, the constructed curve S is smaller in radius than the part surface 160.

Next, a tangential vector $V_t$ is calculated from the constructed curve S in step 146 so that it passes through the first contact point $C_1$. The tangential vector $V_t$ is designated by the numeral 164 in FIG. 4C. A directional vector $V_d$, as indicated by the numeral 166, is calculated in step 148 by subtracting the coordinates of the contact point $C_1$ from the coordinates of the direction point D. An angle A, as indicated by the numeral 168, between the directional vector $V_d$ and the tangential vector $V_t$ is calculated in step 150 of FIG. 5B. As noted above, it is preferred that the direction point D be approximately perpendicular to tangential vector $V_t$ at the first contact point $C_1$, which corresponds to an angle A of 90°. Since it is difficult to approach the surface 160 in an exactly perpendicular direction, a predetermined range of acceptable angles A for the directional vector $V_d$ is defined. The range of acceptance is defined as $A = \pm 90° + b$. Preferably, b is about 88° so that the range of acceptance is between ±2° and ±178° relative to the tangential vector $V_t$. (The tangential vector $V_t$ can be oriented in either direction at the tangent point and can be tangent to an outside diameter or an inside diameter.) The range of acceptance is illustrated by the shaded region 170 in FIG. 4C. The range of acceptance can also be viewed as +88° relative to a normal vector at contact point $C_1$. Thus, the same range of acceptable angles is used for planar and curved surfaces.

Figure 4C:
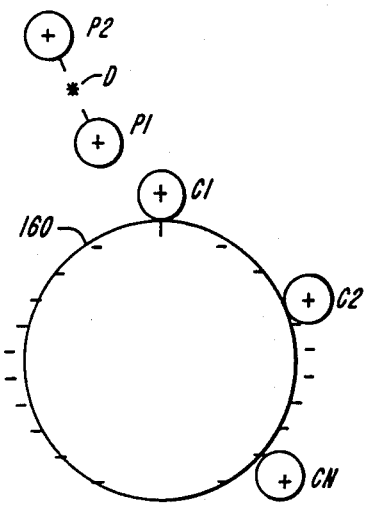
Figure 4C:
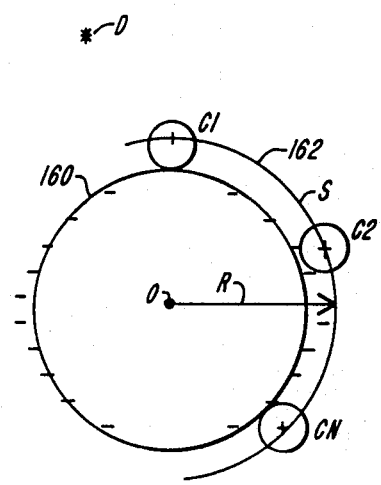
Figure 4C:
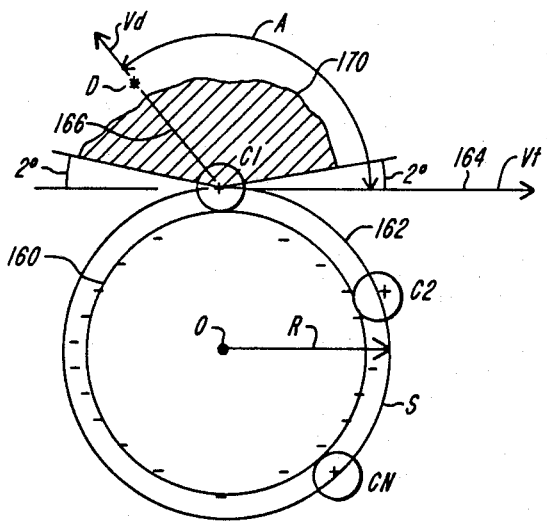
Figure 4D:
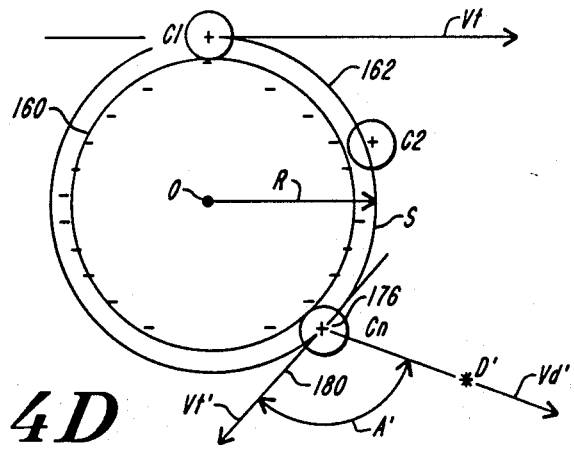

The calculated angle A is compared in step 152 with the predetermined range of acceptance to determine whether the directional vector $V_d$ is valid. When the angle A is outside the predetermined range of acceptance, the operator is notified in step 154 of FIG. 5C of an invalid direction point and must measure a new direction point. In the above example, an invalid direction point is identified when the angle A is outside the range of 2° to 178°. When an invalid direction point is identified, the operator must measure a new direction point D' in step 156 by moving the probe off the surface 160 approximately perpendicular to the last contact point $C_N$, as indicated by the numeral 176 in FIG. 4D, and taking a measurement in space. A new tangential vector $V_t'$, as indicated by the numeral 180 in FIG. 4D, is calculated in step 158 tangent to the constructed surface S and passing through the last contact point $C_N$. The new direction point D' is used in step 159 to calculate a new directional vector $V_d'$ by subtracting the coordinates of the contact point $C_N$ from the coordinates of the new direction point D'.

Figure 4E:
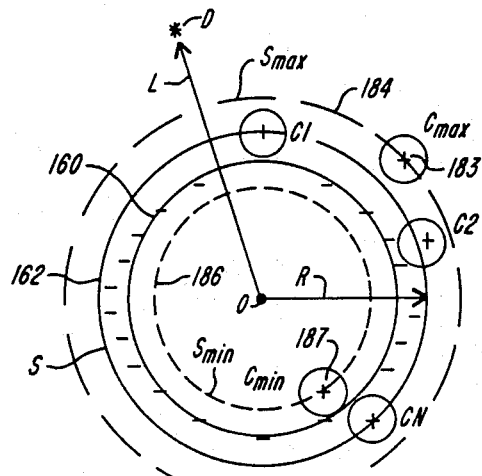
Figure 5A:
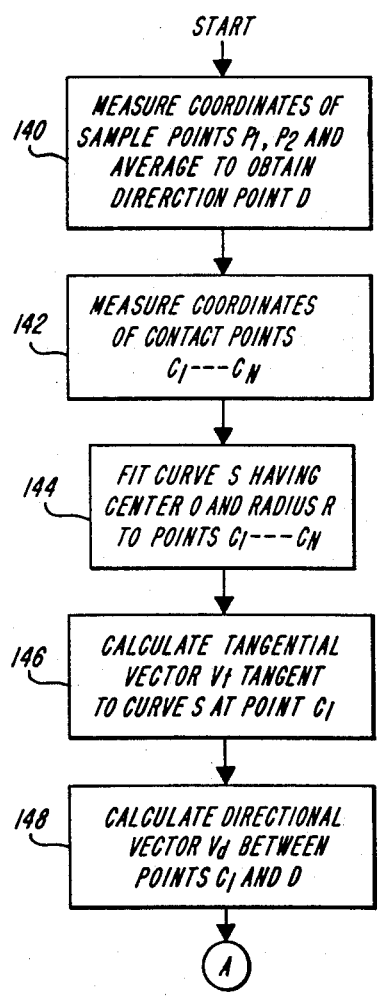

The process then returns to step 150 and a new angle A' is calculated between the new directional vector $V_d'$ and the new tangential vector $V_t'$. The new angle A' is compared in step 152 with the predetermined range of acceptance, as described above. In the large majority of cases, the first direction point D is valid, and steps 154, 156, 158, 159 are not necessary. When either the angle A or the angle A' is within the range of acceptance (2° to 178°), a further test is performed to determine the validity of the direction point D. A curve $S_{max}$, as indicated by the numeral 184 in FIG. 4E, is constructed in step 181 through the point $C_{max}$ with maximum deviation from the curve S in one radial direction. The contact point $C_{max}$, as indicated at 183, is the point farthest from the center point O. The curve $S_{max}$ is parallel to and larger than the constructed curve S. A curve $S_{min}$, as indicated by the numeral 186 in FIG. 4E, is constructed in step 185 through the contact point $C_{min}$ with maximum deviation from the curve S in the opposite radial direction. The contact point $C_{min}$, as indicated at 187, is the point closest to center point 0. The curve $S_{min}$ is parallel to and smaller than the constructed curve S. When the direction point D is located in step 190 between the curves $S_{max}$ and $S_{min}$, it is identified as an invalid direction point, and the operator is required to take a new direction point D'. Then, steps 154, 156, 158 and 159 of FIG. 5C are performed as described above in order to determine a new directional vector $V_d'$ and a new tangential vector $V_t'$. A new angle A' is then calculated and evaluated.

Assuming that the direction point D or D' has been found valid according to the above tests, step 192 of FIG. 5D involves a comparison of the distance L between the direction point D and the center point O of the curve S and the radius R of the curve S, as illustrated in FIG. 4E. When the distance L from center point O to direction point D is greater than the radius R, then the part surface 160 is considered an outside diameter and the probe offset is subtracted from the radius R in step 194. This makes the constructed curve S and the part surface 160 coincide. When the distance L between direction point D and center point 0 is less than the radius R, then the part surface 160 is considered an inside diameter and the probe offset is added to the radius R in step 196. This also makes the constructed curve S and the part surface 160 coincide.

While there has been shown and described what is at present considered the preferred embodiments of the present invention, it will be obvious to those skilled in the art that various changes and modifications may be made therein without departing from the scope of the invention as defined by the appended claims.

What is claimed is:

1. In a machine for measuring coordinates of a generally planar surface on a workplace by contacting points with a probe having a prescribed diameter and continuously sampling and recording the coordinates of the probe, a method for automatically compensating the planar surface being measured for probe offset comprising the steps of:
   (a) moving the probe toward the planar surface and measuring the coordinates of a direction point D just before contact between the probe and the planar surface;
   (b) moving the probe along the planar surface and measuring the coordinates of at least three contact points $C_1$-$C_N$ with the probe and the planar surface in contact;
   (c) fitting by electronic data processing means a plane S to the contact points $C_1$-$C_N$, the plane S being defined by a normal vector $V_n$ passing through the first contact point $C_1$ and a coordinate of the intersection between plane S and vector $V_n$;
   (d) calculating by electronic data processing means a directional vector $V_d$ between the first contact point $C_1$ and direction point D;
   (e) calculating by electronic data processing means an angle A between the normal vector $V_n$ and the directional vector $V_d$, and when the angle A is greater than 90°, reversing the direction of the normal vector $V_n$;
   (f) when the angle A is in the range between the predetermined range of acceptance and 90°, rejecting the direction point D as invalid and repeating the compensation procedure; and
   (g) when the angle A is within a predetermined range of acceptance, moving the plane S by electronic data processing means by the dimension of the probe offset in a direction opposite the direction of the normal vector $V_n$ so that the plane S coincides with the planar surface, thereby compensating for probe offset.

2. A method for probe offset compensation as defined in claim 1 wherein the step of measuring the coordinates of direction point D includes the steps of measuring the coordinates of two sample points just before contact between the probe and the planar surface and averaging the coordinates of the two sample points.

3. A method for probe offset compensation as defined in claim 1 wherein the step of fitting a plane S to the contact points $C_1$-$C_N$ includes the step of utilizing a least squares fit algorithm to calculate a definition of the plane S.

4. A method for probe offset compensation as defined in claim 1 wherein the predetermined range of acceptance is about ±88 degrees relative to the normal vector $V_n$.

5. A method for probe offset compensation as defined in claim 1 further including the steps of
   defining a plane $S_{max}$ parallel to plane S and passing through the contact point determined by electronic data processing means to have maximum deviation from plane S in the direction of the normal vector $V_n$,
   defining a plane $S_{min}$ parallel to plane S and passing through the contact point determined by electronic data processing means to have maximum deviation from plane S in the direction opposite to the normal vector $V_n$, and
   rejecting the direction point D as invalid it is located between the planes $S_{max}$ and $S_{min}$ and repeating the compensation procedure.

6. A method for probe offset compensation as defined in claim 1 wherein the step of repeating the compensation procedure further includes the steps of
   measuring the coordinates of a new direction point D' approximately perpendicular to the last contact point $C_N$ by moving the probe off the surface in a direction approximately perpendicular to the contact point $C_N$ and taking a coordinate measurement,
   defining a new normal vector $V_n'$ passing through the last contact point $C_N$,
   calculating a new directional vector $V_d'$ between the last contact point $C_N$ and the new direction point D', and
   repeating steps (e)–(g) with vectors $V_n$ and $V_d$ replaced by vectors $V_n'$ and $V_d'$, respectively.

7. A method for probe offset compensation as defined in claim 5 wherein the step of repeating the compensation procedure further includes the steps of
   measuring the coordinates of a new direction point D' approximately perpendicular to the last contact point $C_N$ by moving the probe off the surface in a direction approximately perpendicular to the contact point $C_N$ and taking a coordinate measurement,
   defining a new normal vector $V_n'$ passing through last contact point $C_N$,
   calculating a new directional vector $V_d'$ between the last contact point $C_N$ and the new direction point D', and
   repeating steps (e)–(g) with the vectors $V_n$ and $V_d$ replaced by vectors $V_n'$ and $V_d'$, respectively.

8. In a machine for measuring coordinates of a curved surface on a workpiece by contacting points on the curved surface with a probe having a prescribed diameter and continuously sampling and recording the coordinates of the probe, a method for automatically compensating the curved surface being measured for probe offset comprising the steps of:

(a) moving the probe toward the curved surface measuring the coordinates of a direction point D just before contact between the probe and the curved surface;

(b) moving the probe along the curved surface and measuring the coordinates of at least three contact points $C_1$-$C_N$ with the probe and the curved surface in contact;

(c) fitting by electronic data processing means a curve S to the contact points $C_1$-$C_N$, the curve S being defined by a center O and a radius R;

(d) calculating by electronic data processing means a tangential vector $V_t$ tangent to the curve S at the first contact point $C_1$;

(e) calculating by electronic data processing means a directional vector $V_d$ between the first contact point $C_1$ and direction point D;

(f) calculating by electronic data processing means an angle A between the tangential vector $V_t$ and the directional vector $V_d$;

(g) when the angle A is outside the predetermined range of acceptance, rejecting the direction point D as invalid and repeating the compensation procedure;

(h) when the angle A is within a predetermined range of acceptance and the distance between direction point D and the center O of curve S is greater than the radius R of curve S, subtracting the probe offset from the radius of the curve S by electronic data processing means so that the curve S coincides with the curved surface, thereby compensating for probe offset; and (i) when the angle A is within the predetermined range of acceptance and the distance between the direction point D and the center O of curve S is less than the radius R of curve S. adding the probe offset to the radius R of the curve S by electronic data processing means so that the curve S coincides with the curved surface, thereby compensating for probe offset.

9. A method for probe offset compensation as defined in claim 8 wherein the step of measuring the coordinates of direction point D includes the steps of measuring the coordinates of two sample points just before contact between the probe and the curved surface and averaging the coordinates of the two sample points.

10. A method for probe offset compensation as defined in claim 8 wherein the step of fitting a curve S to the contact points $C_1$-$C_N$ includes the step of utilizing a least squares fit algorithm to calculate a definition of the curve S.

11. A method for probe offset compensation as defined in claim 8 wherein the predetermined range of acceptance is between about 2 and 178 degrees relative to the tangential vector $V_t$.

12. A method for probe offset compensation as defined in claim 8 further including the steps of
defining a curve $S_{max}$ parallel to curve S and passing through the contact point determined by electronic data processing means to have maximum deviation from curve S in one radial direction,
defining a curve $S_{min}$ parallel to curve S and passing through the contact point determined by electronic data processing means to have maximum deviation from curve S in the opposite radial direction; and
rejecting the direction point D as invalid if it is located between the curves $S_{max}$ and $S_{min}$ and repeating the compensation procedure.

13. A method for probe offset compensation as defined in claim 8 wherein the step of repeating the compensation procedure further includes the steps of
measuring the coordinates of a new direction point D' approximately perpendicular to the last contact point $C_N$ by moving the probe off the surface in a direction approximately perpendicular to the contact point $C_N$ and taking a coordinate measurement,
calculating a new tangential vector $V_t'$ passing through the last contact point $C_N$ and tangent to the curve S,
calculating a new directional vector $V_d'$ between the last contact point $C_N$ and the new direction point D', and
repeating steps (f)-(i) with the vectors $V_t$ and $V_d$ replaced by vectors $V_t'$ and $V_d'$, respectively.

14. A method for probe offset compensation as defined in claim 12 wherein the step of repeating the compensation procedure further includes the steps of
measuring the coordinates of a new direction point D' approximately perpendicular to the last contact point $C_N$ by moving the probe off the surface in a direction approximately perpendicular to the contact point $C_N$ and taking a coordinate measurement,
calculating a new tangential vector $V_t'$ passing through the last contact point $C_N$ and tangent to the curve S,
calculating a new directional vector $V_d'$ between the last contact point $C_N$ and the new direction point D', and
repeating steps (f)-(i) with the vectors $V_t$ and $V_d$ replaced by vectors $V_t'$ and $V_d'$, respectively.

* * * * *